United States Patent [19]

Candor

[11] 4,413,425

[45] Nov. 8, 1983

[54] METHOD FOR THERMAL/VACUUM DRYING A WET WEB OF MATERIAL

[76] Inventor: James T. Candor, 5440 Cynthia La., Dayton, Ohio 45429

[21] Appl. No.: 330,240

[22] Filed: Dec. 14, 1981

Related U.S. Application Data

[60] Continuation-in-part of Ser. No. 174,886, Aug. 4, 1980, Pat. No. 4,319,407, which is a division of Ser. No. 85,216, Oct. 16, 1979, Pat. No. 4,236,317, which is a continuation-in-part of Ser. No. 849,097, Nov. 7, 1977, Pat. No. 4,189,845, which is a continuation-in-part of Ser. No. 809,945, Jun. 24, 1977, Pat. No. 4,135,307, which is a division of Ser. No. 695,092, Jun. 11, 1976, Pat. No. 4,050,162, which is a continuation-in-part of Ser. No. 541,218, Jan. 15, 1975, Pat. No. 3,977,937, which is a continuation-in-part of Ser. No. 405,023, Oct. 10, 1973, Pat. No. 4,060,449.

[51] Int. Cl.[3] .......................... F26B 3/34; B01D 57/02

[52] U.S. Cl. .......................................... 34/1; 204/180 R

[58] Field of Search ............. 34/1; 373/1; 204/180 R, 204/300 R

[56] References Cited

U.S. PATENT DOCUMENTS 3,404,462 10/1968 Hanson et al. ............................ 34/1

4,359,826 11/1982 Rounsley .................................. 34/1

FOREIGN PATENT DOCUMENTS 36632 9/1981 European Pat. Off. .

OTHER PUBLICATIONS

"Review of IPC Research in High-Intensity and Thermal/Vacuum Drying Processes" at pp. 38 and 39 of the Oct. 15, 1981, *Paper Trade Journal.*

*Primary Examiner*—John J. Camby

*Attorney, Agent, or Firm*—Candor, Candor & Tassone

[57] ABSTRACT

A thermal/vacuum drying method is provided and comprises the steps of sandwiching a part of a wet web of material with a porous web between a pair of moving heat conductive layers, heating the layer adjacent the wet web, cooling the layer adjacent the porous web to thereby cause the particles of liquid of the wet web to be vaporized by the heated layer and be condensed back to particles of liquid by the cooled layer while the layers and the webs are moving together in a sandwiched relation, and imposing an electrostatic field at least through part of the moving sandwich of the webs by charging at least one of the layers to augment the thermal/vacuum drying of the wet web while the part of the sandwich is disposed between the layers.

5 Claims, 18 Drawing Figures

METHOD FOR THERMAL/VACUUM DRYING A WET WEB OF MATERIAL

CROSS REFERENCES TO RELATED APPLICATIONS

This application is a Continuation-in-Part patent application of its copending parent patent application, Ser. No. 174,886, filed Aug. 4, 1980, now U.S. Pat. No. 4,319,407, which, in turn, is a divisional patent application of its copending parent application, Ser. No. 085,216, filed Oct. 16, 1979, now U.S. Pat. No. 4,236,317, which, in turn is a Continuation-in-Part application of its copending parent application, Ser. No. 849,097, filed Nov. 7, 1977, now U.S. Pat. No. 4,189,845, which, in turn, is a Continuation-in-Part application of its copending parent application, Ser. No. 809,945, filed June 24, 1977, now U.S. Pat. No. 4,135,307, which, in turn, is a divisional patent application of its copending parent application, Ser. No. 695,092, filed June 11, 1976, now U.S. Pat. No. 4,050,162, which, in turn, is a Continuation-in-Part application of its copending parent application, Ser. No. 541,218, filed Jan. 15, 1975, now U.S. Pat. No. 3,977,937, which, in turn, is a Continuation-in-Part application of its copending parent application, Ser. No. 405,023, filed Oct. 10, 1973, now U.S. Pat. No. 4,060,449.

BACKGROUND OF THE INVENTION

This invention relates to an improved method and apparatus for electrostatically drying a layer of wet material.

It is now well known from the U.S. patent to Stiles, U.S. Pat. No. 3,705,847, that a slurry of fluid and paper-making fibers can be passed between parallel adjacent runs of two continuous and looped conductive belt means which are charged to provide a potential differential therebetween and thereby cause the fibers in the slurry to form into a non-patterned, non-woven fiber mat on one of the belt means by an electrophoretic action while liquid is driven toward the other belt means by electro-osmosis so that the thus formed fiber mat can be transferred from its respective belt means to be further dried to form a dired sheet of paper or the like.

It is well known from the U.S. patent to Kalwaites, U.S. Pat. No. 2,862,251, that a slurry of fluid and natural or synthetic fibers can be formed into a continuous sheet in a conventional paper-making apparatus and before the resulting non-patterned fiber mat has been dried, jets of liquid can be forced through the fiber mat in combination with unique forming structure to cause the fibers in the fiber mat to be rearranged into a predetermined pattern comprising spaced interconnected packed fibrous portions with less dense or apertured portions therebetween whereby a patterned non-woven sheet is subsequently provided when the rearranged fiber mat is subsequently dried.

It is suggested in the U.S. patent to Candor et al., U.S. Pat. No. 3,757,426, and the various related U.S. patents referred to therein, that a slurry of fluid and papermaking fibers can be formed into a fibrous sheet by utilizing electrostatic means to remove liquid from such slurry during a paper-making operation or the like.

It is a feature of the invention of at least the aforementioned parent application, Ser. No. 405,023, to provide means for making a patterned non-woven sheet similar to the patterned sheets described in the aforementioned patent to Kalwaites by utilizing modified means of the aforementioned U.S. patents to Candor et al. and Stiles.

In particular, one embodiment of that invention provides a method and apparatus for making a patterned non-woven sheet by providing a slurry of fluid and fibers and forming that slurry into a sheet-like form. An electrostatic field action is created to act on such sheet-like form and cause the fibers thereof to be arranged into a predetermined pattern whereby a patterned non-woven sheet is provided.

It is another feature of that invention to provide an improved apparatus and method for making a non-woven sheet, whether or not such non-woven sheet is a patterned non-woven sheet or an unpatterned non-woven sheet, by providing improved means of the aforementioned Candor et al and Stiles arrangements.

In particular, one embodiment of that invention provides a method and apparatus for making a non-woven sheet from a slurry of fluid and fibers by passing a sheet-like form of such slurry between insulating faces of a pair of spaced apart electrode means that provide an electrostatic field action therebetween that acts on the sheet-like form to assist in the making of the non-woven sheet.

An embodiment of the invention of at least the aforementioned patent application, Ser. No. 541,218, provides a method and apparatus for making a non-woven sheet from a slurry of liquid and fibers by passing a sheet-like form of such slurry between two spaced apart surfaces while creating an electrostatic field action that acts on the sheet-like form between the two surfaces and causes at least part of the fibers to be arranged into a sheet adjacent one of the surfaces and at least part of the liquid to be arranged adjacent the other of the surfaces. Such embodiment of that invention can have means for causing at least part of the liquid to be drawn through the other surface at a controlled rate. Alternately or in addition thereto, such embodiment of that invention can be provided with needle-like projections on one of the surfaces to project at least partially into the sheet-like form disposed between the surfaces and assist the electrostatic field action in forming the sheet adjacent one of the surfaces.

Such needle-like projections are also believed to assist the electrostatic field action in removing liquid from the formed fibrous sheet because the projections are disposed closely adjacent the liquid remaining in the liquid bearing sheet of the aforementioned method and apparatus.

For example, see the December 1960 *Scientific American* article of H. A. Pohl at pages 107–116 wherein the author describes the feature of electrostatically pumping a dielectric liquid from a supply thereof by passing a fine wire electrode through the liquid reservoir and out of the same to cause the liquid to be driven up the wire electrode and off the end thereof at a rapid rate solely by the potential differential between the electrode and the liquid.

Thus, it is believed according to the invention set forth in at least the aforementioned patent application, Ser. No. 685,092 that such liquid removing action will also be effective in removing retained liquid from liquid bearing material of the liquid absorbing type by having the needle-like projections of that invention project completely through the liquid bearing material to assist in spraying liquid therefrom during the electrostatic liquid removing action thereon whether or not such material is being electrostatically formed, had been electrostatically formed, is being formed by other means or had been formed by other means and is merely to be dried.

Accordingly, it can be seen that the previously described needle-like projections can be utilized for a dual purpose, namely, to assist an electrostatic action in forming a layer of material from a slurry thereof and to assist an electrostatic action in removing retained liquid from a layer of material.

Therefore, it is a feature of the invention in the aforementioned patent application, Ser. No. 849,097, to illustrate, describe and claim a method and/or apparatus wherein such needle-like projections are utilized for one or both of the above functions.

In particular, it is believed that the layer forming and drying apparatus of the U.S. patent to Kunkle et al., U.S. Pat. No. 4,003,819 and/or of the U.S. patent to Inoue, U.S. Pat. No. 3,962,069 can be modified to include the needle-like projections of this invention to improve upon the electrostatic layer forming operation and/or the electrostatic layer drying operation thereof.

For example, one embodiment of that invention provides a method and apparatus for forming a layer of material against a movable conveying means from a slurry of a liquid and the material by an electrostatic action so that the layer of material can be subsequently removed in layer form from the conveying means, the method and apparatus including a plurality of needle-like projections disposed in the slurry to assist the electrostatic action in forming the layer of material from the slurry against the conveying means. Such needle-like projections can also be thereafter utilized to electrostatically move retained liquid in the thus formed layer of material to tend to remove liquid from the layer of material.

It is a feature of the invention in the aforementioned patent application, Ser. No. 085,216, to provide means for always causing the needle-like projections to completely project through the layer as the layer is being formed against one side of the conveying means in the above manner.

It is known from the article "Review of IPC research in high-intensity and thermal/vacuum drying processes" at pages 38 and 39 of the Oct. 15, 1981, *Paper Trade Journal*, that one way to provide a thermal/vacuum drying would be to confine the air-free wet paper web and felt between two steel bands after the wet paper web has been contacted by a highly heated member whereby one steel band that is heated will evaporate the liquid in the paper web and the evaporated liquid would condense back to a liquid on the other band that is cooled.

It is a feature of this invention to utilize the electrostatic drying means of the previously described methods and apparatus to augment the thermal/vacuum drying of the aforementioned article.

Accordingly, it is an object of this invention to provide an improved method of drying a layer of material, the method of this invention having one or more of the novel features of this invention as set forth above or hereinafter shown or described.

Another object of this invention is to provide an improved apparatus for drying a layer of material, the apparatus of this invention having one or more of the novel features of this invention as set forth above or hereinafter shown or described.

Other objects, uses and advantages of this invention are apparent from a reading of this description, which proceeds with reference to the accompanying drawings forming a part thereof and wherein:

BRIEF DESCRIPTION OF THE DRAWINGS

FIG. 2 is a schematic view illustrating the improved method and apparatus of this invention believed to be adapted to make the patterned non-woven sheet of FIG. 1 or the like.

FIG. 10 is a fragmentary view similar to FIG. 2 and schematically illustrates another improved method and apparatus of this invention believed to be adapted to make the patterned non-woven sheet of FIG. 1 or the like.

FIG. 12 is a view similar to FIG. 10 and schematically illustrates another improved method and apparatus of this invention believed to be adapted to make the patterned non-woven sheet of FIG. 1 or the like.

DESCRIPTION OF THE PREFERRED EMBODIMENTS

Figure 1:
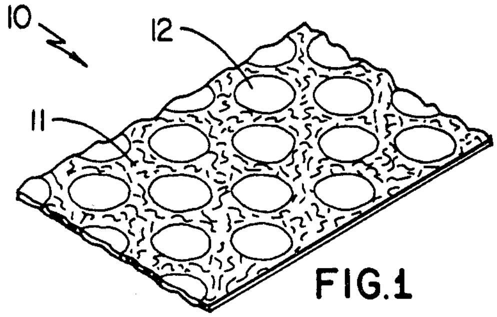
FIG. 1 is a fragmentary, perspective view illustrating a patterned non-woven sheet that is intended to be made by the method and apparatus of this invention.
Figure 3:
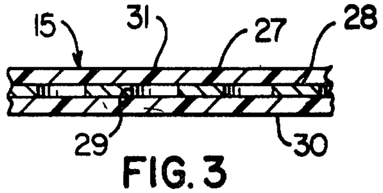
FIG. 3 is an enlarged, fragmentary, cross-sectional view taken on line 3—3 of FIG. 2 and illustrates the structure of the upper belt means of the apparatus of FIG. 2, FIG. 3 being turned 180° from the position taken on line 3—3 of FIG. 2.

While the various features of this invention are hereinafter described and illustrated as being particularly adapted to remove liquid from liquid bearing material, it is to be understood that the various features of this invention can be utilized singly or in any combination thereof to provide for merely moving the liquid within the liquid bearing material or other fibrous structures or the like as desired.

Therefore, this invention is not to be limited to only the embodiments illustrated in the drawings, because the drawings are merely utilized to illustrate some of the wide variety of uses of this invention.

Referring now to FIG. 1, a patterned non-woven structure is generally indicated by the reference numeral 10 and can comprise patterned areas 11 of interconnected bundles of fibers surrounding other patterned areas 12. The patterned areas 12 can either be somewhat uniformly arranged apertures passing through the sheet 10 or be substantially uniformly arranged areas of fibers that are less dense than the density of the fibers in the other interconnected patterned areas 11.

As previously stated, the U.S. patent to Kalwaites, U.S. Pat. No. 2,862,251, fully discloses how such patterned sheet means 10 can be formed with the more dense areas 11 and the less dense areas 12 being arranged in various predetermined patterns by forcing jets of fluid through appropriately shaped apertured sheets and then through a non-patterned fiber mat to cause a rearranging of the fibers in such mat to provide the patterned arrangement of more dense areas 11 and less dense areas 12 whereby the resulting patterned sheet has the characteristic feel, hand and drape of conventional textile fabrics for similar uses.

Figure 2:
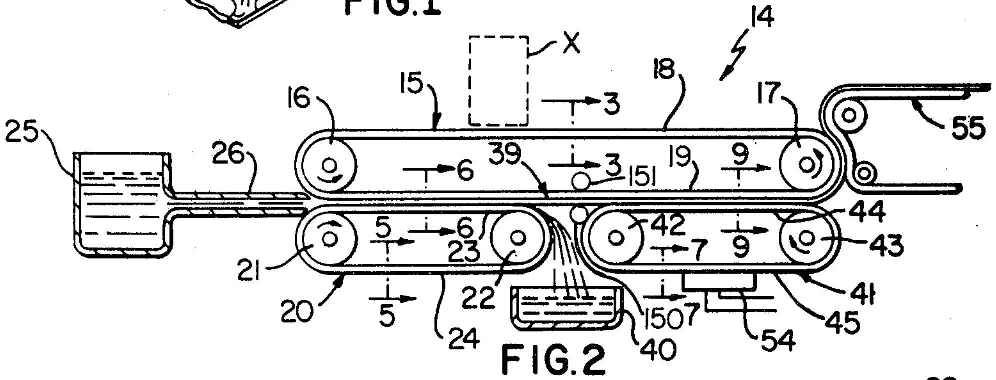

The method and apparatus of this invention that is intended to form the non-woven sheet 10 of FIG. 1 is generally indicated by the reference numeral 14 in FIG. 2 and comprises an upper looped continuous belt means 15 passing around rollers 16 and 17 to define an upper run 18 and a lower run 19 thereof.

Another looped continuous belt means 20 of this invention is looped around rollers 21 and 22 to define an upper run 23 and a lower run 24 thereof whereby the upper run 23 of the lower belt 20 is disposed adjacent, but spaced from the lower run 19 of the upper belt means 15 to run substantially parallel therewith and be maintained uniformly spaced therefrom and have the side edges thereof sealed in the same manner as similar belt means in the aforementioned U.S. patent to Stiles, U.S. Pat. No. 3,705,847.

A slurry of the desired fluid and fibers, such as a liquid and paper making fibers, can be fed from a supply means 25 through a trough 26 to be fed in a continuous or intermittent sheet-like form between the adjacent runs 19 and 23 of the belt means 15 and 20 with such sheet-like form of slurry being somewhat uniformly provided by having the trough 26 vibrated in a suitable manner as provided in the aforementioned patent to Stiles.

Figure 4:
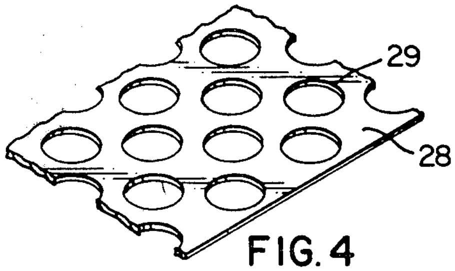
FIG. 4 is a fragmentary, perspective view illustrating the conductive electrode means of the belt means of FIG. 3.

The upper belt means 15 of this invention can be formed from flexible electrically insulating material 27, such as plastic material, having a flexible conductive sheet or electrode 28 embedded therein and being formed into a desired pattern such as by having a plurality of apertures 29 passing completely therethrough in a patterned arrangement as illustrated in FIG. 4 for a purpose hereinafter described.

Figure 8:
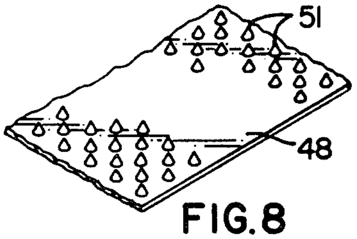
FIG. 8 is a fragmentary, perspective view illustrating the conductive member or electrode means of the belt means of FIG. 7.

The conductive sheet 28 of the belt means 15 is thus electrically insulated from the opposed faces 30 and 31 thereof and can be appropriately charged at the side edges of the belt means 15 in any suitable manner, such side edge charging of the belt means 15 being provided by the lead means 32 schematically illustrated in FIG. 8 and charging the conductive sheet 28 with a positive charge for a purpose hereinafter described.

While one form of a patterned conductive sheet 28 for the belt means 15 is illustrated in FIG. 4, as well as in FIGS. 11 and 13, it is to be understood that other forms of patterned conductive sheets can be utilized in any of the embodiments of this invention to provide a patterned non-woven sheet in the manner hereinafter described. For example, such patterned conductive sheet can actually comprise a wire screen, grill, etc., as the particular shape of the patterned areas 11 and 12 of the non-woven sheet 10 do not form the novel features of this invention as one of the novel features of this invention is to provide a non-woven sheet with any desired patterned areas.

Figure 5:
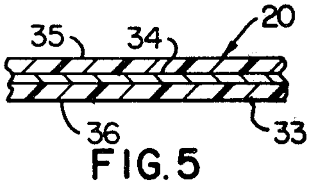
FIG. 5 is an enlarged, fragmentary, cross-sectional view taken on line 5—5 of FIG. 2 and illustrates a lower belt means of the apparatus of FIG. 2, FIG. 5 being turned 180° from the position taken on line 5—5 of FIG. 2.
Figure 6:
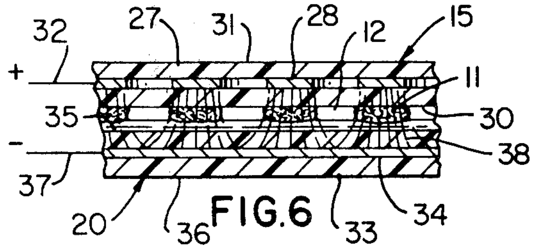
FIG. 6 is an enlarged, fragmentary, cross-sectional view taken on line 6—6 of FIG. 2 and illustrates how it is believed that the patterned non-woven sheet can be formed between the adjacent runs of the belt means of FIGS. 3 and 5.

The lower belt means 20 of this invention is best illustrated in FIG. 5 and also comprises a flexible sheet of electrically insulating material 33 also having a conductive sheet or electrode 34 embedded therein so as to be electrically insulated from opposed faces 35 and 36 of the belt means 20 while being adapted to be provided with a charge at the side edges thereof as illustrated schematically in FIG. 6 wherein a lead means 37 is illustrated as charging the conductive sheet 34 with a negative charge for a purpose hereinafter described.

Figure 11:
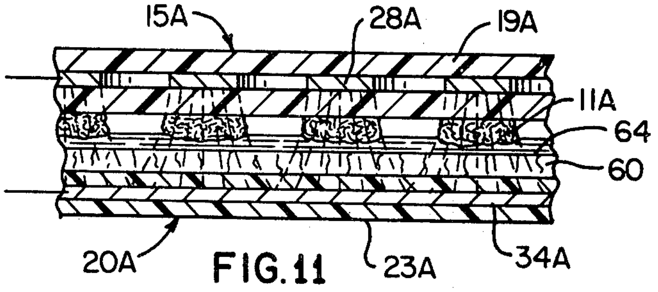
FIG. 11 is an enlarged, fragmentary, cross-sectional view taken on line 11—11 of FIG. 10 and illustrates how it is believed that the patterned non-woven sheet can be formed between the adjacent runs of the belt means of FIG. 10.
Figure 13:
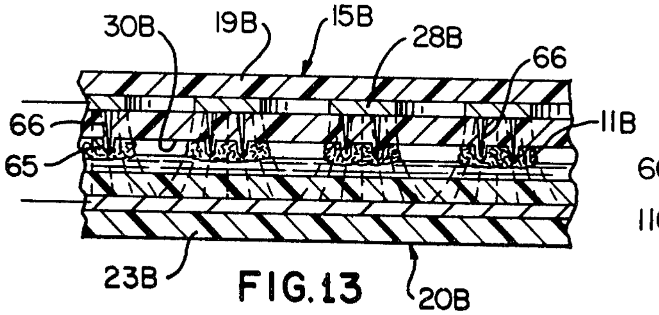
FIG. 13 is an enlarged, fragmentary, cross-sectional view taken on line 13—13 of FIG. 12 and illustrates how it is believed that the patterned non-woven sheet can be formed between the adjacent runs of the belt means of FIG. 12.

While the conductive sheet 34 of the lower belt means 20 is illustrated as being continuous throughout and non-patterned, as well as in FIGS. 11 and 13, it is to be understood that the conductive sheet 34 could be also patterned in the same manner or in any desired different manner than the conductive sheet 28 of the upper belt means 15 in order to produce a desired electrostatic field action therewith which will produce a patterned non-woven sheet of the desired pattern as hereinafter described.

In any event, it can be seen that when the upper belt 15 is driven in a counterclockwise direction and the lower belt 20 is driven in a clockwise direction so that the adjacent runs 19 and 23 thereof continuously move from left to right in FIG. 2 at substantially the same speed, the slurry of fluid and fibers being fed from the supply means 25 through the trough 26 to the adjacent runs 19 and 23 of the belts 15 and 20 enters the same in a sheet-like form in a continuous manner and it is believed tht the electrostatic field generated between the oppositely charged conductive sheets 28 and 34 of the belt means 15 and 20 will cause the fibers in the slurry between the runs 19 and 23 of the belt means 15 and 20 to form into a patterned non-woven mat against the surface 30 of the upper belt means 15 while the liquid in the slurry will be driven downwardly toward the surface 35 of the lower belt means 20 by the combined electrophoretic and electro-osmotic action of the electrostatic field on the slurry between the oppositely charged conductive sheets 28 and 34 which causes the fibers to move upwardly and the liquid to move downwardly as fully described in the aforementioned U.S. patent to Stiles.

However, according to the teachings of this invention, no electrical current flow takes place between the conductive layers 28 and 34 of the belt means 15 and 20 as the same are respectively insulated from the slurry disposed therebetween and it is believed that the electrostatic field action still functions in the same manner as in the patent to Stiles to drive the fibers upwardly and the liquid downwardly, so that a fiber mat is formed against the lower surface 30 of the lower run 19 of the upper belt means 15.

However, because the conductive sheet 28 of the upper belt means 15 of this invention is formed in a predetermined pattern, it is believed that such patterned conductive sheet 28 will cooperate with the lower conductive sheet 34 of the lower belt means 23 to create a plurality of non-uniform electrostatic fields that are generally indicated by the reference numeral 38 in FIG. 6 to cause the fibers to be formed against the surface 30 of the upper belt means 15 in a patterned arrangement of more dense interconnected fiber bundles 11 adjacent the non-perforated portions of the conductive sheet 28 while the fibers of the slurry will form adjacent the perforated parts 29 of the conductor sheet 28 with a pattern either of areas 12 of no fibers or of fibers less dense than the fibers in its interconnected areas 11 since it is well known that the more intense portion of a non-uniform field is stronger than a less intense portion of the non-uniform field so that the fibers will tend to form into the more dense bundles 11 adjacent the more intense portions of the fields 38 which are adjacent the unperforated parts of the conductive sheet 29 as illustrated in FIG. 6.

It is also believed that the liquid in the slurry between the runs 19 and 23 of the belts 15 and 20 will be driven downwardly even though it is toward the less intense portions of the non-uniform fields 38 because of the attraction of liquid for a negative charge which is on the conductive sheet 34. Also, the paper-making fibers have a tendency to be negatively charged and therefore tend to normally move toward the positively charged upper conductive sheet 28.

However, it is believed that there are times when there will be neutral fiber particles and the like in the slurry whereby the non-uniform fields will move such neutral particles toward the upper belt 15 through the action of the more intense parts of the non-uniform fields 38 tending to move neutral particles upwardly through the action of die-electrophoresis whereby it is believed that all of the particles and fibers in the slurry will be utilized in forming the patterned mat against the belt 15.

Of course, if the lower belt means 20 has its conductive sheet 34 also provided with a pattern of conductive parts and non-conductive parts in a like manner or a different manner that the upper patterned conductive sheet 28, it is believed that the fibers will merely move upwardly where field actions are provided between the conductive parts of the upper and lower sheets 28 and 34, whether or not such fields are non-uniform, and will not move to any great extent into areas where no field action is taking place therebetween whereby it is believed that the resulting fiber mat against the upper belt 15 can be provided with the desired pattern through the patterned arrangement of either one or both of the upper and lower electrode means 28 and 34.

Therefore, it is believed that by the time the fiber mat passes beyond the upper run 23 of the lower belt 20 in the apparatus 14 illustrated in FIG. 2, the same has been formed into sufficiently self-adhering patterned non-woven sheet form that is indicated by the reference numeral 39 in FIG. 2 to be further dried in its fiber arranged form in any suitable manner, the liquid from the slurry that has been removed from the fiber mat 39 by the electro-osmotic action of the fields 38 flowing off of the upper run 23 of the lower belt 20 as the same passes around the right-hand roller 22 to be received in a suitable reservoir 40 in the manner fully described in the aforementioned U.S. patent to Stiles, with such liquid being relatively free of fibers, etc., to be reused in processing more fibers for forming the slurry for the source 25.

Thus, the patterned non-woven mat 39 as it leaves the lower belt means 20 can be subsequently treated and dried in any desired manner, such as the manners set forth in the aforementioned U.S. patents to Kalwaites, Stiles and Candor et al.

However, if desired, the patterned non-woven sheet 39 can have at least some of the remaining liquid therein removed by another belt means of this invention that is generally indicated by the reference numeral 41 in FIGS. 2 and 7 and cooperates with the upper belt means 14 in a manner hereinafter described.

The continuous belt means 41 of this invention is looped around rollers 42 and 43 so as to provide an upper run 44 and a lower run 45 with the upper run 44 being disposed substantially parallel to but spaced from the lower run 19 of the upper belt 14 so that when the lower belt means 41 is driven in a clockwise direction to FIG. 2 so as to have the upper run 44 running at substantially the same speed as the lower run 19 of the upper belt 15, the fiber mat 39 leaving the other lower belt means 20 will enter between the adjacent runs 44 and 19 of the belt means 41 and 15 to be carried from left to right therewith and have at least some of the liquid thereof removed by an electro-osmotic action as hereinafter described.

Figure 7:
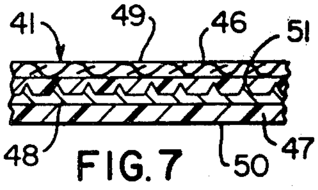
FIG. 7 is an enlarged, fragmentary, cross-sectional view taken on line 7—7 of FIG. 2 and illustrates another lower belt means of the apparatus of FIG. 2, FIG. 7 being turned 180° from the position taken on line 7—7 of FIG. 2.

The belt means 41 is best illustrated in FIG. 7 and comprises a layer 46 of felt or other porous absorbing material attached to a flexible electrically insulating sheet 47 having a conductive sheet or electrode 48 embedded therein whereby the conductive sheet 48 is electrically insulated by the sheet 47 from the opposed faces 49 and 50 of the belt means 41 as well as from the felt layer 46.

Figure 9:
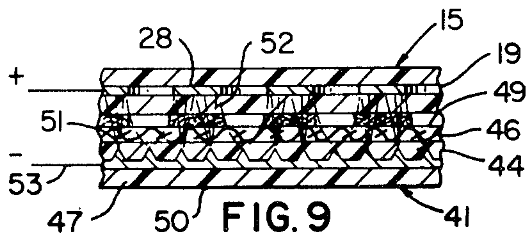
FIG. 9 is an enlarged, fragmentary, cross sectional view taken on line 9—9 of FIG. 2 and illustrates how it is believed that the formed non-woven sheet of this invention will pass between the upper belt means of FIG. 3 and the lower belt means of FIG. 7.

The electrode 48 can take any desired configuration and in the embodiment of this invention illustrated in the drawings, the conductive sheet 48 comprises a continuous conductive sheet having a plurality of conductive points 51 projecting upwardly therefrom toward the felt layer 46 with the points 51 being disposed in any desired pattern that will be cooperable with the unperforated portion of the conductive sheet 28 of the upper belt 15 to provide a plurality of non-uniform electrostatic fields that are generally indicated by the reference numeral 52 of FIG. 9 when the conductive sheet 48 is charged with a negative charge by a lead means 53 that is schematically illustrated in FIG. 9 so that the more intense portions of the non-uniform fields 52 will be directed downwardly into the felt layer 46 of the belt means 41 and thereby drive at least some of the retained moisture in the fibrous mat 39 downwardly into the felt layer 46 to be carried away by the felt layer 46 in the manner set forth in the aforementioned U.S. patents to Stiles and Candor et al.

The retained moisture that is now driven into the felt layer 46 of the belt 41 can be subsequently removed therefrom by having the lower run 46 of the belt 41 pass over a suction box means 54, FIG. 2, or any other suitable liquid-removing means.

The pattern of the points 51 of the conductive sheet 48 of the belt 41 can be so arranged relative to the unperforated portions of the conductive sheet 28 of the upper belt 51 that when the mat 39 passes between the adjacent runs 44 and 19 thereof in the manner illustrated in FIG. 9, a plurality of non-uniform fields will be extended through the more dense portions 11 of the mat 39 than the less dense portions 12 thereof for a believed to be better moisture removal operation.

Therefore, it can be seen that the method and apparatus 14 of this invention is readily adapted to take a slurry of fluid and fibers in sheet-like form and through the cooperation of the conductive layers 28 and 34 of the adjacent runs 19 and 23 of the belt means 15 and 20 to arrange the fibers into a predetermined pattern by an electrophoretic action while removing some of the liquid therefrom by an electro-osmotic action so that a patterned fibrous mat 39 will be formed therefrom which can further have the retained moisture therein removed electro-osmotically by passing through the electrostatic field means 52 created between the conductive sheet 28 of the lower run 19 of the upper belt 15 and the conductive sheet 48 of the upper run 44 of the lower belt means 41 so that a more dried patterned non-woven mat 39 can be removed from the right-hand end of the belt means 15 by suitable take-off belt means 55 in the same mamnner as set forth in the aforementioned U.S. patent to Stiles for further treating and/or drying of the mat 39 by other electro-osmotic means or conventional drying means, as desired.

While the non-uniform fields 38 being provided between the belt means 15 and 20 of this invention are illustrated as each having its more intense portion directed upwardly, it is to be understood that the conductive layers 28 and 34 could be so constructed and arranged that the more intense portions could point downwardly or could be in any desired pattern of pointing upwardly and downwardly for the desired purposes. Likewise, the electrostatic fields 52 between the belt means 15 and 41 of this invention could through the proper arrangement of the conductive sheets 28 and 48 be provided with the more intense portions thereof pointing upwardly rather than downwardly as illustrated or any combination of patterns that point up and down for the desired purpose.

Further, while the belt means 15, 20 and 41 have been illustrated as having the conductive parts forming a part thereof, it is to be understood that stationary electrodes could be disposed inside the runs of the respective belt means 15, 20 and 41 to create a field action across the space defined between the cooperating runs thereof as fully provided in the aforementioned patent to Candor et al.

Also, while the fields 38 and 52 have been illustrated and described as being non-uniform fields, it is to be understood that the same could be uniform fields, if desired. Such uniform fields would then produce a non-pattern non-woven sheet in the above manner.

Therefore, it can be seen that this invention not only provides an improved method and apparatus for forming a patterned non-woven sheet, but also this invention provides improved methods and apparatus for making an unpatterned non-woven sheet, or the like.

However, while the apparatus and method 14 has been previously described as forming the non-woven mat 39 by originally arranging the fibers in the predetermined patterns 11 and 12, it is believed that the method and apparatus 14 could act on an already formed mat wherein the fibers are non-patterned and not permanently secured together to rearrange the fibers thereof into the patterned areas 11 and 12 as the same passes between the belts 15 and 20 through the action of the fields 38 and the moisture of such rearranged mat would be removed therefrom by the electro-osmotic action of the fields 38 and the fields 52 as the rearranged mat passes between the belts 15 and 41. Thus, it is believed that by appropriately charging certain already existing structure disclosed in the aforementioned patent to Kalwaites and similar patents of Kalwaites, the fibers of the material disclosed therein would be rearranged electrostatically with or without the rearranging fluid jets disclosed in such patent or patents.

Also, if it is found that it is desirable to have the conductive parts 28 and 34 of the upper and lower belts 15 and 20 in electrical contact with the slurry therebetween as in the patent to Stiles, the conductive sheet 28 could have the openings 29 thereof filled with insulating material so that the fibers would only be attracted to the unperforated parts thereof to produce the patterned mat 39 previously described.

Further, it is believed that the belt means 15 of the method and apparatus 14 of this invention as previously described could be utilized to form the patterned non-woven mat 39 by having a charged image translated into the belt 15 from a master pattern copy in a manner similar to a Xerox process wherein the Xerox process copies the pattern of a master sheet by charging a belt means or roller in just the area thereof that corresponds to the pattern on the sheet to be copied. For example, see the U.S. patent to Heine-Galdren et. al., U.S. Pat. No. 3,795,443 which illustrates and describes typical Xeroxing processes.

Therefore, a suitable image charging device X is illustrated by dash lines in FIG. 2 to indicate a unit that could receive a master copy having a desired pattern thereon and through suitable means will translate the pattern from that master copy to create a chargeable patterned area of the belt means 15 which, in turn, will produce the mat 39 with such pattern as the fibers from the slurry between the runs 19 and 23 of the belts 15 and 20 will be attracted to the charged areas of the belt 15 in the manner previously described.

In this manner the apparatus 14 can be changed to produce different patterns by merely inserting a different master pattern copy in the apparatus X in much the same manner that a Xerox machine will produce a different printed sheet each time a new master sheet is inserted therein.

Therefore, it is believed that the apparatus and method 14 of this invention could almost function in the same manner as a conventional Xerox machine to produce different patterned sheets intermittently or continuously, whether formed of fibers or particles of other desired materials, in a relatively simple manner without requiring a new belt 15 for each different pattern.

Of course, the translating device X could be of the type that receives its master pattern from magnetic tape means, card means, etc., rather than merely be an optical image translating device, as desired.

It is to be understood that all of the above-described variations of the method and apparatus 14 of FIG. 2 from that illustrated in FIGS. 2-9 could equally apply to the other embodiments of this invention that are illustrated in the other Figures where such variations are appropriate.

While the liquid being driven from the sheet-like form in the apparatus 14 of FIG. 2 by electro-osmosis is carried on the upper run 23 of the belt 20 to run off of the same into the reservoir 40 at the roller 22, it is a feature of another embodiment of this invention to have such belt means 20 be provided with a pervious surface means which will draw the removed liquid therein at a controlled rate as the liquid and fiber means are being separated between the adjacent runs of the upper and lower belts 15 and 20.

Figure 10:
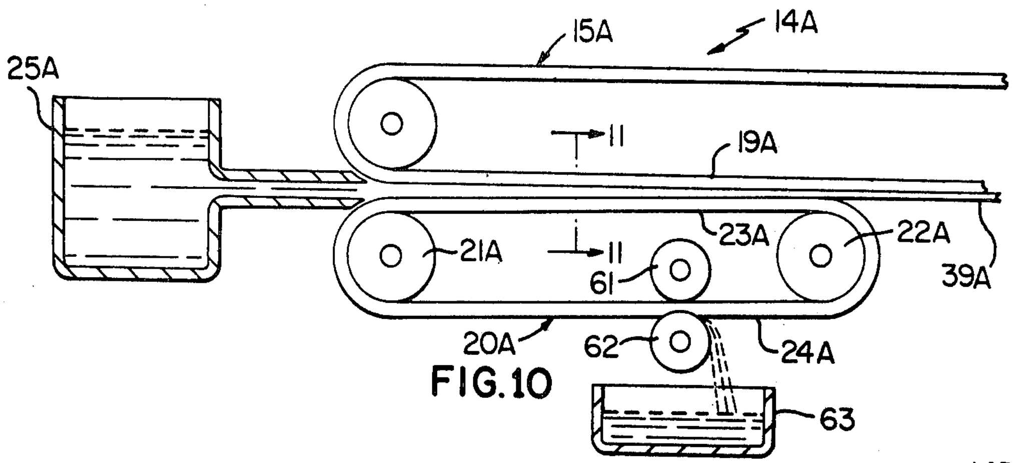

In particular, another embodiment of this invention is generally indicated by the reference numeral 14A in FIG. 10 and parts thereof similar to the method and apparatus 14 previously described are indicated by like reference numerals followed by the reference letter "A".

As illustrated in FIGS. 10 and 11, the upper belt 15A is substantially indentical to the belt 15 previously described and the lower belt 20A is substantially identical to the belt 20 previously described except that the belt 20A has an additional moisture pervious layer 60 thereon that is adapted to receive liquid therein at a controlled rate as will be apparent hereinafter, the pervious layer 60 being on the outer surface of the belt 20A so as to be disposed spaced from the belt 15A as the slurry is formed in the sheet-like form therebetween.

Also, the rollers 21A and 22A for the belt 20A are so arranged that the upper run 23A of the belt 20A is angled relative to the lower run 19A of the upper belt 15A for a purpose hereinafter described, the gap between the runs 19A and 20A narrowing as the same moves from the left to right in the drawings.

Further, a pair of squeezing rollers 61 and 62 are provided for cooperating together to act on the lower run 24A of the lower belt 20A to squeeze moisture from the pervious layer 60 thereof as will be apparent hereinafter whereby the removed moisture from the squeezed run 24A of the belt 20A can flow off the lower squeezing roller 62 into a reservoir 63 for reuse thereof as desired.

The operation of the method and apparatus 14A of this invention will now be described.

As the slurry of liquid and fibers from the supply 25A enters the space between the adjacent runs 19A and 23A of the belts 15A and 20A, the same is acted on by the electrostatic fields created between the conductor means 28A and 34A of the belts 15A and 20A in the manner previously described whereby the fibers form into the interconnected bundles 11A adjacent the run 19A of the belt 15A while the liquid is driven downwardly toward the run 23A of the belt 20A against the top surface 64 of the pervious layer 60.

It is believed that the pervious layer 60 could have the capillaries and pores thereof so constructed and arranged that the same will only permit the liquid to enter into the layer 60 at a controlled rate even though the electrostatic field action is tending to move the liquid downwardly toward the conductive layer 34A of the belt 20A whereby only the separated out liquid of the slurry sheet-like form would be entering into the layer 60 as the belt 20A moves from left to right in FIG. 10 so that by the time the particular section of the belt 20A reaches the roller 22A, there is only the collected fibers being disposed between the runs 19A and 23A of the belts 15A and 20A as the layer 60 is of sufficient thickness to absorb all of the separated liquid by the time it reaches the pulley 22A.

In this manner, it is believed that as the liquid is being absorbed into the layer 60 of the lower belt 20A, as the sheet-like form moves from left to right in FIG. 10, the unseparated liquid and fibers are being moved closer to the lower run 19A of the upper belt 15A to increase the action of the electrostatic field action thereon to separate the same as the conductors 28A and 34A of the belts 15A and 20A are being moved closer together as the same move from left to right in FIG. 10 and thereby decreases the amount of time for forming the mat 39A as previously described.

The moisture now retained in the layer 60 of the belt 20A is squeezed therefrom by the cooperating rollers 61 and 62 as illustrated in FIG. 10 so that the layer 60, when the same returns to be adjacent the belt 15A, can reabsorb additional moisture therein in the manner described previously.

Figure 12:
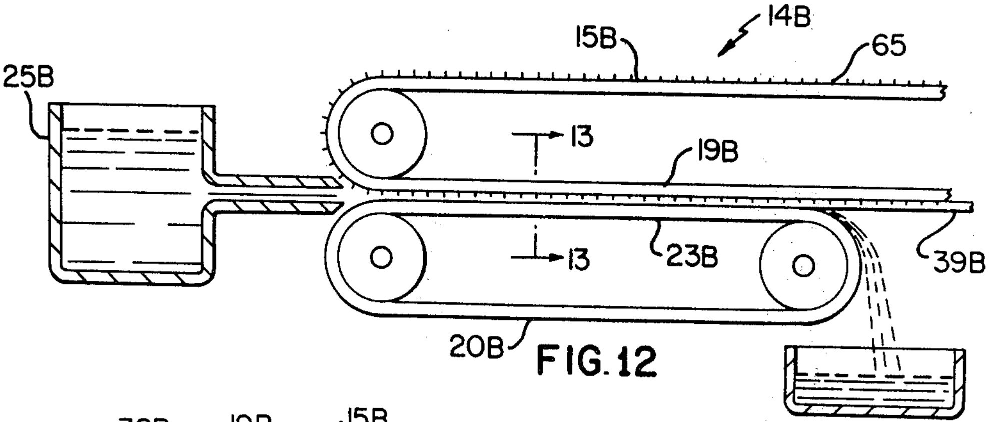

Another method and apparatus of this invention is generally indicated by the reference numeral 14B in FIG. 12 and parts thereof similar to the method and apparatus 14 previously described are indicated by like reference numerals followed by the reference letter "B".

As illustrated in FIGS. 12 and 13, the upper and lower belts 15B and 20B of the method and apparatus 14B are substantially identical to the belts 15 and 20 previously described except that the upper belt 15B has a plurality of projections 65 extending outwardly therefrom with such projections 65 comprising needle-like conductive members 66 extending from the conductive layer 28B thereof and beyond the outer surface 30B thereof so as to project into the space between the adjacent runs 19B and 23B of the belts 15B and 20B as illustrated in FIGS. 12 and 13. The projecting parts of the needle-like members 66 are still insulated by the insulating layer 30B so as to maintain the needle-like conductors 66 out of electrical contact with the sheet-like form being disposed between the belts 15B and 20B by the reservoir 25B in the manner previously described.

While the projections 65 are illustrated as only partially extending across the gap between the belts 15B and 20B, it is to be understood that the projections 65 could extend completely across the gap between the belts 15B and 20B or to just the extent that the fiber bundles 11B are being formed or actually extend out of the fiber bundles 11B as desired.

In any event, it can be seen that as the sheet-like form of fibers and liquid moves from left to right in the apparatus 14B of FIG. 12, the previously described electrostatic field action causes the fibers to form the interconnected fiber bundles 11B adjacent the lower run 19B of the belt 15B while the liquid is driven downwardly toward the upper run 23B of the lower belt 20B as previously described. However, it is believed that the needle-like projections 65 assist such electrostatic field action in driving the fibers upwardly toward the belt 15B and/or drive the liquid downwardly toward the belt 20B through the non-uniform field action created by the needle-like members 65 themselves.

Also, it may be found that such needle-like members 65 should be on the lower belt 20B in lieu of or in addition to the needle-like members 65 on the upper belt 15B, such combination of needle-like members 65 on both belts 15B and 20B being arranged so as to be directed toward each other, or staggered, or overlapping, etc., as desired, and with all or some of the needle-like members of one or both belts 15B and 20B extending completely and/or partially through the sheet-like form of slurry that is disposed therebetween.

Also, the improved belt 15B of FIG. 12 could be utilized with the improved belt 20A of FIG. 10 or the improved belts 15B and 20A can be utilized by themselves in the manner illustrated on the drawings as desired.

In any event, the upper belts 15A and 15B can be utilized to cooperate with belts similar to the belt 41 previously described to further drive the moisture out of the mats 39A and 39B in the manner previously described.

Figure 14:
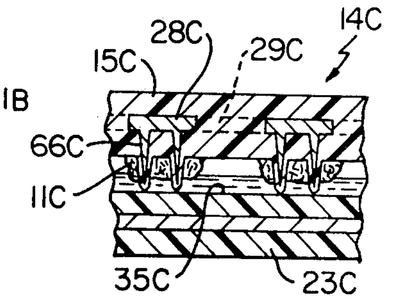
FIG. 14 is a view similar to FIG. 13 and illustrates another embodiment of the method and apparatus of this invention.

Another method and apparatus of this invention is generally indicated by the reference numeral 14C in FIG. 14 where parts similar to the apparatus 15B previously described are indicated by like reference numerals followed by the reference letter "C".

As illustrated in FIG. 14, it can be seen that the upper belt 15C is substantially the same as the upper belt 15B of FIG. 13 except that the insulated projections 66C of the belt 15C extend all the way into engagement with the upper surface 35C of the lower belt 23C as illustrated whereby the projections 66C not only help form the interconnected fiber bundles 11C in the manner previously described, but such projections 66C maintain a positive spacing between the upper and lower belts 15C and 20. Thus, since the projections 66C are disposed throughout the entire surface area of the upper belt 15C in any desired pattern, accurate alignment between the upper and lower belts 15C and 20C can be maintained by having the projections 66C contact the upper surface 35C of the lower belt 20C for a more accurate controlling of the electrostatic action previously described.

Also, it can be seen that in the belt 15C of the apparatus and method 14C of FIG. 14, the spacings 29C formed in the conductive plate or sheet 28C are completely filled in with the insulating material of the belt 15C whereby the conductive plate 28C can be molded right into the insulating material of the belt 15C if desired.

As previously stated, it is believed that the projections on the various belt means of this invention also have the effect of improving the electrostatic removal of the retained liquid in the fibrous sheet being formed. It is also believed that such projections would be beneficial to remove the retained moisture from fibrous material that has already been formed, whether the same has been formed electrostatically in the manner previously described, or has been formed by other means and is to merely have the retained moisture thereof removed electrostatically, the retained moisture either being moisture that was utilized in the formation of the material or merely moisture that has been subsequently disposed in such material in any manner.

Figure 15:
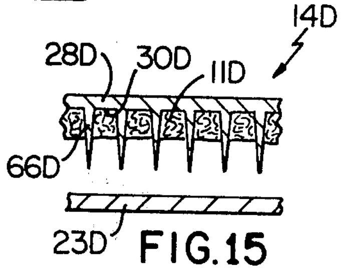
FIG. 15 is a view similar to FIG. 14 and illustrates another method and apparatus of this invention.

Thus, reference is now made to FIG. 15 wherein another method and apparatus of this invention is generally indicated by the reference numeral 14D and parts similar to the other methods and apparatus of this invention are indicated by like reference numerals followed by the reference letter "D".

As illustrated in FIG. 15, the upper conductive belt 28D has its lower surface 30D disposed in contact with a wet fibrous web 11D and has a plurality of needle-like projections 66D extending completely through the web material 11D. In this manner, the plate or sheet 28D and projections 66D are adapted to have the same electrical potential imposed thereon in any suitable manner and create an electrostatic field action with a lower conductive belt 23D to cause the moisture retained in the fibrous belt 11D to tend to be pumped down the projections 66D and sprayed off the ends thereof toward the lower belt 20D in substantially the same manner and for the same reasons advanced in the aforementioned article in the December 1960 *Scientific American* magazine.

While the conductive belt 28D and its projections 66D, as well as the conductive belt 23D, have been illustrated in FIG. 15 as being uninsulated, it is to be understood that one or all of the parts could be insulated in the manner previously described as the other belts of this invention. Further while the projections 66D are illustrated as completely passing through the fibrous material 11D, it is to be understood that the same could only project into the material 11D any desired amount of project to just the lower edge thereof or project out of the same any desired distance.

Further, the projections 66D could be integral with the belt 28D or formed separate therefrom and be fastened thereto in any suitable manner whereby whether the projections 66D are formed separately or formed integrally with the plate 28D, it can be seen that the same are, in effect, secured to the plate 28D for the purpose previously described.

Accordingly, it is believed that the projections 66D as well as the other projections 66 and 66C previously described, are adapted to improve the electrostatic moisture removing operation of the previously described methods and apparatus of this invention.

Figure 16:
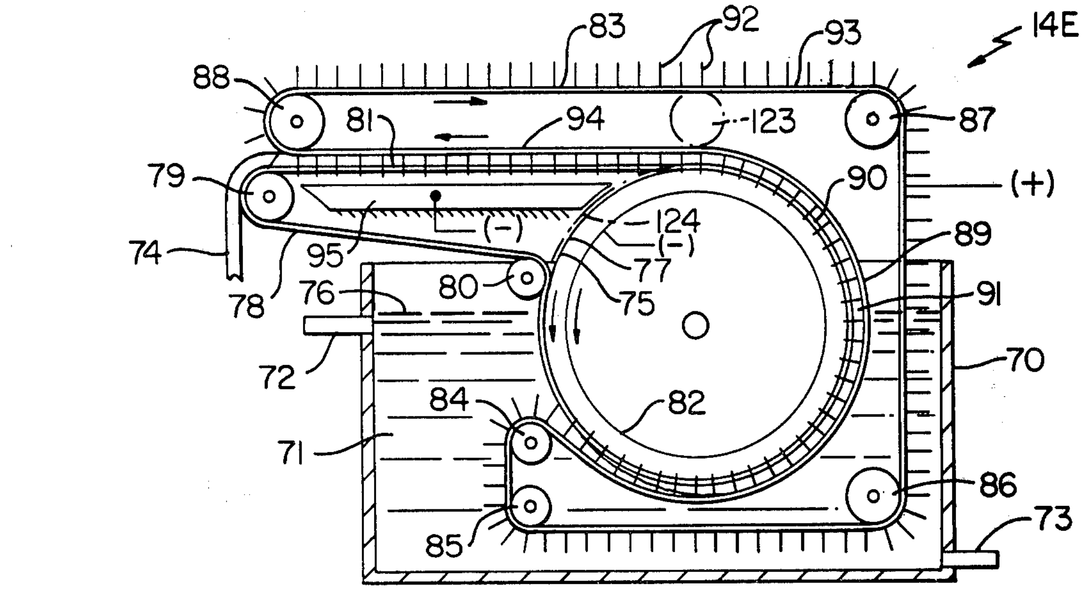
FIG. 16 is a view similar to FIG. 2 and illustrates another embodiment of the method and apparatus of this invention.

Referring now to FIG. 16, another method and apparatus of this invention is generally indicated by the reference numeral 14E and basically comprises a modification of the filter cake or layer making apparatus and method illustrated and described in the aforementioned U.S. patent to Kunkle et al., U.S. Pat. No. 4,003,819.

In particular, the method and apparatus 14E comprises a storage tank 70 for containing a slurry 71 of a suitable liquid and particles of a suitable material from which a desired layer of material is to be formed therefom, such as the clay layer or filter cake described and illustrated in the aforementioned patent to Kunkle et al., U.S. Pat. No. 4,003,819.

Such slurry 71 is adapted to be fed into the tank 70 through an inlet conduit 72 and spent slurry liquid is adapted to be removed from the tank 70 through an outlet conduit 73 so that the tank 70 will continuously contain the slurry 71 at the desired mixture of liquid and particles of material to produce the filter cake or layer 74 in a manner hereinafter described.

A drum or conveying means 75 is rotatably mounted in the storage tank 70 to have a portion thereof submerged below the level 76 of the slurry 71 as illustrated, the drum 75 being adapted to be rotated in a counterclockwise direction as indicated by the arrows in FIG. 16.

The drum 75 has an outer foraminous cylindrical surface 77 formed of electrically non-conductive material and is adapted to have a pervious and electrically non-conductive belt means 78 engaged continuously against a portion thereof, the belt means 78 being adapted to be looped around not only part of the drum 75, but also looped around a roller 79 spaced therefrom and be guided back to the drum 75 by another roller 80 as illustrated so that as the drum 75 rotates in a counterclockwise direction, the belt 78 will rotate therewith and move away from the drum 75 at the top thereof to the roller 79 and thereby provide a substantially horizontally disposed section 81 thereof for a purpose hereinafter described.

However, it can be seen that the roller 80 is so arranged relative to the drum 75, that the outer periphery 77 of the drum 75 is fully covered by the non-conductive pervious belt 78 in the area thereof that is submerged in the slurry 71 for a purpose hereinafter described.

The drum 75 carries an inner cylindrical electrode 82 that is adapted to rotate therewith and is inwardly spaced from the outer periphery 77 thereof as illustrated and for a purpose hereinafter described, the inner electrode 82 being adapted to have a negative charge imposed thereon for a purpose hereinafter described.

Another continuous belt 83 of this invention is looped around a plurality of rollers 84, 85, 86, 87 and 88 in the manner illustrated so that a section 89 of the belt 83 will be disposed and guided by suitable guide means (not shown) in an arcuate manner so as to be substantially concentric with and spaced from the portion 90 of the belt 78 that is trained against the outer periphery 77 of the drum 75 whereby the sections 89 and 90 of the belts 83 and 78 define, in effect, a chamber 91 therebetween which receives the slurry 71 of the storage tank 70 therein and will act thereon in a manner hereinafter described to cause particles of the material in the slurry 71 to form the layer 74 against the section 90 of the belt 78 to be subsequently conveyed thereon along the horizontal section 81 of the belt 78 to the left-hand end thereof where the layer 74 is removed for any desired purpose.

The belt 83 of this invention is formed of electrically conductive material and has a plurality of needle-like electrically conductive projections 92 extending from the side 93 thereof so as to cooperate with the non-conductive and pervious belt section 90 so as to project therethrough and into the space of the drum 75 between the outer periphery 77 thereof and the inner electrode 82 as illustrated as well as project completely through the section 81 of the belt 78 as the belt 78 continues to move from the drum 75 to the lefthand roller 88 as illustrated, the belt 83 defining a substantially horizontal section 94 thereof between the drum 75 and the roller 88 so as to be disposed parallel with and spaced from the section 81 of the belt 78 as illustrated.

In this manner, the needle-like projections 92 not only completely pass through the space 91 between the sections 89 and 90 of the belts 83 and 78 as illustrated, but also the same completely pass through the layer 74 that is produced between the belts 83 and 78 in a manner hereinafter described.

The belt 83 and its needle-like projections 92 are adapted to be provided with a positive charge as illustrated for a purpose hereinafter described.

If desired, a suitable liquid receiving receptacle 95 can be disposed below the section 81 of the belt 78 to receive liquid being driven electrostatically from the layer 74 in a manner hereinafter described, the receptacle 95 being formed from a conductive material and being adapted to be provided with a negative charge as illustrated.

Therefore, it can be seen that the method and apparatus 14E of this invention can be formed in a relatively simple manner, such as by a modification of the method and apparatus disclosed in the aforementioned U.S. patent to Kunkle et al., U.S. Pat. No. 4,003,819, to operate in a manner now to be described.

Assuming that the slurry 71 being fed to the storage tank 70 has the desired particles of material mixed with the desired liquid, such as clay particles in water, and that the electrode 82 and electrode belt 83 are respectively provided with a positive and negative charge so as to produce the desired voltage differential therebetween, it is believed that the particles of material from the slurry 71 will be continuously deposited onto the section 90 of the belt 78 as the belt 78 moves in a counterclockwise direction about the drum periphery 77 in the manner set forth in the aforementioned patent to Kunkle et al., U.S. Pat. No. 4,003,819, not only through the electrodeposition action of the cooperating electrode means 82 and 83, but also by having the interior of the drum 75 connected to a suitable evacuation device so as to lower the pressure therein to cause the particles of material in the slurry 71 to filter out onto the section 90 of the belt 78 whereby by the time the sections 90 and 89 of the belts 78 and 83 arrive at the top of the drum 75 to leave the same and move to the left, the layer 74 of material will move therewith whereby a continuous layer 74 of material can be formed from the slurry 71 as previously described.

However, it is believed that since the belt 83 has the plurality of needle-like projections 82 extending through the slurry 71 completely across the space 91 between the sections 89 and 90 of the belts 83 and 78 and actually extending through the outer periphery 77 of the drum 75 as illustrated, such projections 92 will assist the forming of the layer 74 against the belt 78 as well as tend to cause retained liquid in the thus forming layer 74 to move into the drum 75 for the reasons previously set forth in regard to the projections 66D of the method and apparatus 14D previously described.

In addition, it can be seen that as the layer 74 is moving with the horizontal sections 81 and 94 of the belts 78 and 83 from the drum 75 to the left in FIG. 16, the potential differential between the belt 83 and the reservoir 95 tends to further dewater the layer 74 through an electro-osmotic action with the projections 92 further enhancing such electrostatic dewatering of the layer 74 in the same manner as previously described in connection with the projections 66D of the method and apparatus 14D previously described.

Accordingly, it is believed that the projections 92 of the conductive belt 83 of this invention will cause the layer 74 to form at a more rapid rate and in a thicker manner on the belt section 90 than if the belt 83 and projections 92 were not utilized.

It is further believed that the belt 83 and its projections 92 will cause a greater electrostatic dewatering of the formed layer 74 not only while the layer 74 is on the drum 75, but also while the layer 74 is off the drum and moving toward the roller 79 than if the belt 83 and its projections 92 were not utilized.

Therefore, it can be seen that the method and apparatus of the aforementioned U.S. patent to Kunkle et al., U.S. Pat. No. 4,003,819, can be modified to utilize the projections 92 and belt 83 of this invention in a manner believed to not only enhance the electrostatic forming of a filter cake or the like but also to enhance the electrostatic dewatering thereof.

Figure 17:
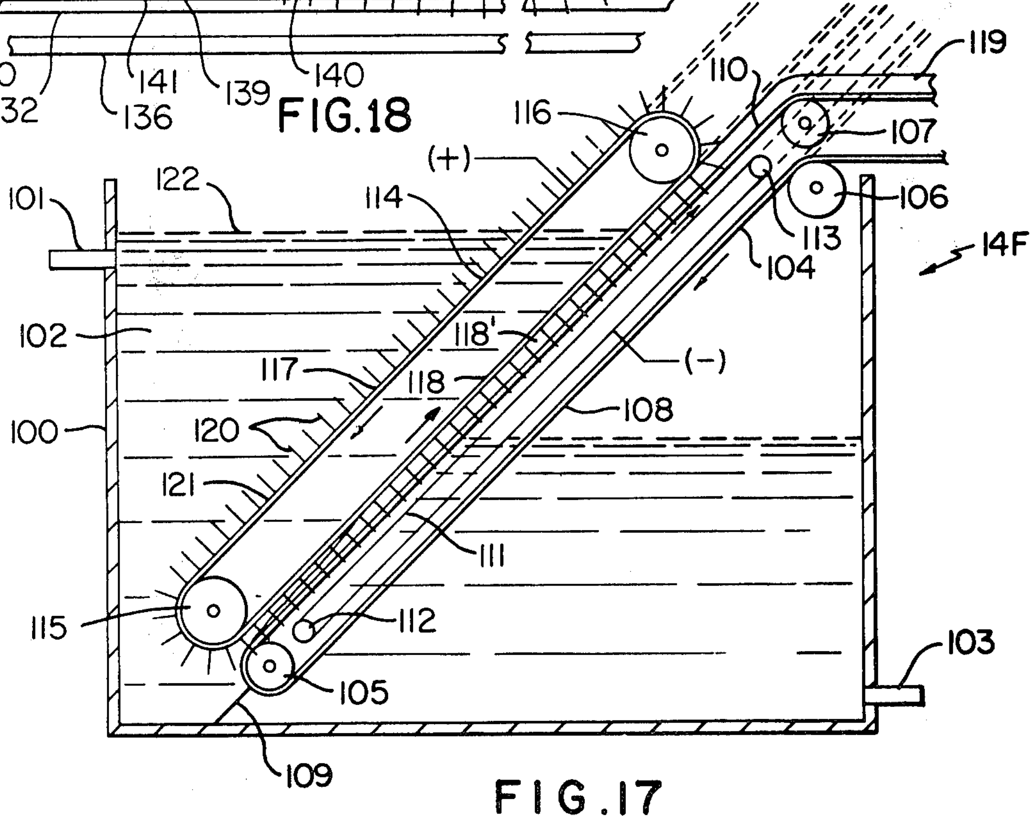
FIG. 17 is a view similar to FIG. 2 and illustrates another embodiment of the method and apparatus of this invention.

Another method and apparatus of this invention is generally indicated by the reference numeral 14F in FIG. 17 and basically comprises a modification of the method and apparatus illustrated and described in the aforementioned U.S. patent to Inoue et al., U.S. Pat. No. 3,962,069.

A continuous belt 104 is looped around a roller 105 disposed in the storage tank 100 and is guided by rollers 106 and 107 so that a substantially straight length 108 of the belt 104 is directed down into the storage tank 100 on the exit side of a baffle means 109 of the storage tank 100 to loop around the roller 105 and create another substantially straight section 110 that extends upwardly through the slurry 102 on the inlet side of the baffle 109 as illustrated.

While the belt 108 in the aforementioned patent to Inoue et al., U.S. Pat. No. 3,962,069, is an electrically conductive belt means or a conductive belt means covered with non-conductive material, the belt means 104 in the method and apparatus 14F of this invention can comprise a porous non-conductive belt 108 so that a conductive electrode means 111 is provided adjacent the exit side of the portion 110 of the belt 104 as illustrated. For example, the electrode 111 can comprise an electrically conductive belt looped around rollers 112 and 113 as illustrated and is adapted to be provided with a negative charge as illustrated.

Another continuous belt 114 is looped around a pair of rollers 115 and 116 so as to define a pair of parallel runs 117 and 118 thereof with the run 118 being disposed spaced from but parallel to the straight section 110 of the belt 104 to define, in effect, a chamber 118 therebetween which receives the slurry 102 to be acted upon and form a layer of material 119 on the belt section 110 to be removed from the storage tank 110 in a manner hereinafter set forth.

The belt 114 is formed of electrically conductive material that has a plurality of needle-like electrically conductive projections 120 secured to the side 121 thereof as illustrated, the belt 114 and, thus, the needle-like projections 120 thereof being adapted to be provided with a positive charge as illustrated.

The projections 120 on the belt 114 are so constructed and arranged that the same are adapted to penetrate completely across the space or chamber 118' of the belts 104 and 114 as well as project completely through the straight section 110 of the belt 104 but be in spaced relation to the electrode 111 as illustrated.

Therefore, it can be seen that it is a relatively simple matter to modify the method and apparatus disclosed in the aforementioned U.S. patent to Inoue et al., U.S. Pat. No. 3,962,069, to include the needle-like projections 120 of this invention to cause the method and apparatus 14F of this invention to operate in a manner now to be described.

With the desired slurry 102 being directed by the inlet conduit 101 into the storage tank 100 so that the level 122 thereof is at the desired level and the electrode means 111 and 114 being charged in the desired manner to provide a desired voltage potential differential therebetween, the movement of the belts 114 and 104 in the directions indicated by the arrows in FIG. 17 causes the adjacent runs 118 and 110 thereof to move in substantial unison upwardly from the rollers 105, 115 to the rollers 107, 116 and thereby cause an electrostatic filtering out of the particles of material in the slurry 102 onto the belt section 110 to form the layer 119 thereof by electrodeposition, electro-osmosis and/or electrochemically as clearly set forth in the aforementioned patent to Inoue et al., U.S. Pat. No. 3,962,069.

However, it is believed that the projections 120 of this invention not only assist the aforementioned electrostatic action in forming the layer 119 on the belt section 110 for the same reasons advanced in connection with the projections 92 of FIG. 16, but also such projections 120 assist the movement of the retained liquid in the layer 119 through the belt section 110 to reduce the water content thereof in the same manner as the projections 92 of FIG. 16.

If desired, the belt 114 and its projections 120 could be substantially longer than that illustrated in FIG. 17 to cooperate with a substantially longer section 110 of the belt 104 than that illustrated whereby such extensions of the belts 104 and 114 are indicated by dash lines in FIG. 17, the electrode means 111 also being extended by dash lines as illustrated if desired. In this manner, it is believed that a greater electrostatic drying of the layer 119 will take place after the same leaves the tank 100.

While the belts 83 and 114 of FIGS. 16 and 17 are illustrated as being imperforate, it is to be understood that the same could be foraminous if desired.

Further, while the belt 83 of FIG. 16 is illustrated as providing the extension section 94 thereof, it is to be understood that the belt 83 could be returned to the storage tank 70 after the same reaches the top of the drum 74 through the use of a roller 123 and the belt 78 could extend section 81 thereof as indicated by the dash-dotted line 124 in FIG. 16.

Also, while the belts 83 and 114 and their projections 92 and 120 are described as being uninsulated, it is to be understood that the same can have electrical insulating material covering the same as previously described, such as is provided for the belt means 15C of FIG. 14.

It is to be understood that the projections 92 and 120 previously described, as well as the other projections previously described, could be of any desired flexibility and/or of any desired diameter and/or of any desired length and/or in any desired pattern.

It is also believed that the projections 92 and 120 on the belts 83 and 114 will respectively assist the conveyor means 78 and 104 in lifting and moving the layers 74 and 119 from the tanks 70 and 100, particularly where the free ends thereof are prevented from flexing by being received in the cooperating belt sections 90, 91 and 110.

Therefore, it can readily be seen that the embodiments 14E and 14F respectively of FIGS. 16 and 17 utilize a plurality of needle-like projections in a slurry to assist an electrostatic action in forming a layer of material from a slurry against a conveyor means and, if desired, can thereafter also assist an electrostatic action in removing retained liquid in the thus formed layer of material.

Thus, while the various embodiments of this invention have been described as acting on a slurry of fibers, clay particles and sludge, it is to be understood that any suitable material can be utilized with any suitable liquid to form a slurry to be acted upon by the methods and apparatus of this invention.

Accordingly, it can be seen that this invention provides an improved method and apparatus for forming a layer of material from a slurry thereof.

In order to further enhance the electrostatic action in removing retained liquid in the thus formed layer of material or in previously formed material it is believed that the needle-like projections of the various electrodes of this invention can be sonically or ultrasonically vibrated while the same are projecting into and/or through the material for the reason fully advanced in the U.S. patents to Candor, U.S. Pat. Nos. 3,965,581 and 3,999,302, the electrodes for the needle-like projections likewise being vibrated or not being vibrated in unison with the vibrating projections as desired.

While in all of the embodiments previously described wherein the needle-like projections on one of the electrodes each has the same length thereof extending through the layer of material being formed from the slurry thereof, it is to be understood that the needle-like projections could be made to progressively project through the layer of material as the thickness of the layer of material is being increased so that the tips of the needle-like projections will always extend just beyond the outer surface of the layer of material as the thickness thereof increases to the desired thickness. Thereafter, the needle-like projections can be pulled from the formed layer in a manner that the formed layer will be stripped from the needle-like projections and this can be accomplished by having the needle-like projections initially project through the member against which the layer of material is being formed so that that member will strip the layer from the projections as the same are pulled out of the member against which the layer is being formed.

Figure 18:
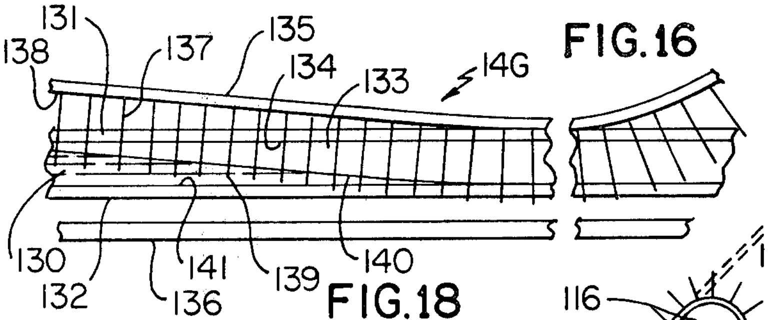
FIG. 18 is a view similar to FIG. 17 and illustrates another embodiment of the method and apparatus of this invention.

For example, another embodiment of the method and apparatus of this invention is generally indicated by the reference numeral 14G in FIG. 18 and parts thereof similar to the methods and apparatus previously described are indicated by like reference numerals followed by the reference letter "G".

As illustrated in FIG. 18, a slurry 130 of liquid and particles of material is fed between a pair of spaced parallel and moving pervious sheet-like members or belts 131 and 132 to the left thereof in any of the manners previously described to progressively form a layer 133 of material against the side 134 of the upper member 130 by the aforementioned electrostatic action created between an upper moving electrode sheet-like member or belt 135 and a lower moving electrode sheet-like member or belt 136, the upper electrode member 135 having a plurality of needle-like projections 137 extending from the side 138 thereof so as to progressively project through the pervious member 131 in the manner illustrated in FIG. 18 as the members 135, 131, 132 and 136 move from left to right in FIG. 18 so that the tips 139 of the needle-like members 137 will always extend just beyond the outer surface 140 of the layer of material 133 as the layer of material 133 is being formed to the desired thickness against the side 134 of the upper member 131 by the previously described electrostatic action being created between the cooperating and oppositely charged electrode means 135 and 136.

In the embodiment 14G illustrated in FIG. 18, the layer of material 133 is being formed to a thickness that completely fills the space between the members 131 and 132 whereby the needle-like projections 137 actually project through the lower member 132 when the thickness of the material 133 extends to the upper side 141 of the lower member 132. In fact, the tips 139 of the projections 137 can actually extend completely through the member 132 when the thickness of the material 133 extends to the upper surface 141 of the member 132 as illustrated in FIG. 18.

The needle-like projections 137 can remain completely through the layer of material 133 after the same has been formed to the desired thickness to further dewater the layer of material 133 in the manners previously described and when it is desired to remove the needle-like members 137 from the formed layer of material 133, the electrode 135 is directed upwardly away from the member 131 so that the needle-like projections 137 thereof are progressively pulled out of the layer of material 133 and are stripped from the layer 133 by the member 131 cooperating with the needle-like projections 137 to strip the material 133 from the needle-like members 137 so that the material 133 is not pulled away by the needle-like members 137 as the same are pulled out of the formed layer of material 133.

Therefore, it can be seen that the method and apparatus 14G of this invention forms the layer of material 133 as the slurry 130 is moved from left to right in FIG. 16 by the action of the electrostatic field being created between the electrodes 135 and 136 to progressively form the layer 133 of increasing thickness against the side 134 of the upper belt-like member 131 with the electrode 135 having the needle-like projections 137 thereof progressively extending through the forming layer 133 in such a manner that only the tips 139 thereof extend slightly beyond the outer surface 140 of the forming layer of material 133 to not only assist in the forming of the layer 133 in the manner previously described, but also to aid in dewatering the forming layer 133 and also in assisting in the forcing of the water through the pervious lower belt-like member 132 towards the electrode 136 by the aforementioned electro-osmotic action.

After the layer of material 133 has been formed to the desired thickness against the side 134 of the upper pervious member 131, the electrode 135 is moved away from the same so as to progressively pull the needle-like members 137 out of the layer 133 so that the layer 133 is stripped from the projections 137 by the pervious belt-like member 131, the movement of the member 135 toward and away from the member 131 being controlled by suitable rollers (not shown) or in any other suitable manner.

It is to be understood that while the method and apparatus 14G of FIG. 18 has a lower pervious member 132 spaced above the lower electrode 136, the lower pervious member 132 could be eliminated if desired.

Also, while the method and apparatus 14G of FIG. 18 has been illustrated and described as forming a layer 133 of material, it is to be understood that the method and apparatus 14G of FIG. 18 could be utilized to merely reduce the liquid content of a mixture of that liquid and another liquid or particles fed to the space between the two pervious members 131 and 132 at the left-hand end thereof so that the percentage of that liquid that is being dewatered out through the pervious layer 132 toward the electrode 136 will be reduced by the time that mixture reaches the right-hand end of the two members 131 and 132. In fact, it is to be understood that such a dewatering or a liquid reducing feature of a mixture could apply to any of the previously described embodiments of this invention if the desired result is merely to reduce the liquid content of a certain mixture rather than form or filter out a layer of material therefrom as previously described. For example, see the U.S. patent to Freeman, U.S. Pat. No. 4,107,026, which is incorporated by reference into this application, for a showing of liquid content reducing features.

It is believed that one unique use of the electrode belt 135 of FIG. 18 wherein the same is progressively inserted through the upper pervious member 131 to assist in dewatering the layer 133 being formed therebetween and then have the layer 133 stripped from the projections 137 after the dewatering action has taken place, is the sludge dewatering method and apparatus disclosed in the U.S. patent to Pepping, U.S. Pat. No. 4,101,400 wherein the needle-like projections 137 of this invention can be utilized on the upper electrode belt 4 illustrated in FIGS. 1-3 of such patent. Accordingly, such patent to Pepping, U.S. Pat. No. 4,101,400, is incorporated by reference into this disclosure for providing a typical apparatus and method where projections on an electrode means thereof in a manner according to this invention might be utilized to assist in the dewatering of the formed or forming layer of moisture bearing material.

It is believed that the various apparatus and methods of this invention previously described can be utilized for thermal/vacuum drying the wet web of material being produced by such apparatus, the electrostatic field means of this invention being utilized therewith to augment the drying effect of the thermal/vacuum drying means not only for the reasons previously set forth in this application, but also for the reasons being set forth in applicant's copending patent application Ser. No. 319,114, filed Nov. 9, 1981, whereby such copending patent application, Ser. No. 319,114, filed Nov. 9, 1981, is being incorporated into this disclosure by this reference thereto.

In particular, it has been found from the aforementioned Oct. 15, 1981, *Paper Trade Journal* magazine, at pages 38 and 39, thereof, that high-intensity and thermal/vacuum drying processes are being worked on at the Institute of Paper Chemistry, in Appleton, Wis., wherein a quick burst of instense heat is received by a wet web of paper and evaporates particles of liquid thereof without overheating the web so the same is now substantially free of air. The air-free wet paper web is then combined in a sandwich with a layer of felt and the sandwich is confined between two moving steel bands, one heated and one cooled. Water evaporated from the wet paper web at the hot band condenses back to liquid water on the cold band. This condensation process creates a vacuum in the adjacent vapor which is hepful in pulling more water vapor out of the wet paper web whereby Pages 38 and 39 of the Oct. 15, 1981, *Paper Trade Journal* magazine are being incorporated into this disclosure by this reference thereto.

Accordingly, it is a feature of this invention to convert the previously described method and apparatus 14 of FIG. 2 into a thermal/vacuum drying system and method so that the electrostatic field means of this invention can augment the thermal/vacuum drying of the wet web.

In particular, reference is now made to FIG. 2 wherein a high-intensity heater 140 is disposed between the lower belts 20 and 41 and is adapted to directly impose its high-intensity heat on the wet fibrous web 39 being formed by the apparatus 14 as the web 39 passes from the belt 20 to the belt 41. The heater 150 heats the web 39 and/or the moisture or liquid in the wet web 39 and causes the liquid to begin to evaporate and push the air out of the web 39 so that air-free heated web 39 is formed into a sandwich with the felt layer 46 on the belt 41 with the sandwich of the wet web 39 and porous layer 46 being disposed between the layers or belts 41 and 15. The upper layer or belt 15 can be heated by a heater 151 and the lower layer or belt 41 can be cooled by forming the rollers 42 and 43 to be cooling devices so that in effect the belt 41 provides a cooled layer below the sandwich of the web 39 and porous web 46 and the upper belt 15 provides a heated layer adjacent the wet web 39 that causes further evaporation of the moisture in the wet web 39 while the cooled belt 41 adjacent the porous layer 46 causes a condensation of the vapor. Thus, it is believed that a thermal/vacuum drying system and method is provided by the cooperating belts 15 and 41 with the webs 39 and 46 sandwiched therebetween in the same manner as set forth in the aforementioned *Paper Trade Journal* magazine article of Oct. 15, 1981.

However, in addition, the sandwich of the wet web 39 and the porous layer 46 also has the electrostatic field means, provided by the cooperating conductive portions or charged electrode means 28 and 48 of the respective belts 15 and 41, imposed thereon to augment the thermal/vacuum drying effect of the belts 15 and 41 on the wet web 39 for the reasons previously set forth and for the reasons set forth in applicant's aforementioned copending patent application Ser. No. 319,114, filed Nov. 9, 1981.

As the belt 15 moves from left to right from the heater 151, the belt 15 can be cooled by having the roller 17 be a cooling device, as well as the roller 16, so that the belt 15 will cooperate with the belt 20 to form the wet layer 39 from the slurry in the manner previously described as it is only from the point where the belt 15 makes contact with the heater 151 that the belt 15 needs to be sufficiently heated to perform the thermal/vacuum drying feature previously described.

In addition, the heater 150 can be so arranged that the same actually will contact the felt or porous layer 46 of the belt 41 before the same forms the sandwich with the heated wet web 39 as illustrated in FIG. 2 so that any moisture remaining in the felt or porous layer 46 after the same passes the suction box 54 will be immediately vaporized to also substantially remove all air from such porous layer 46 before the same forms its sandwich with the substantially air-free wet web 39 that has also had a substantial amount of the liquid therein vaporized by the heater 150 so as to provide a substantially air-free sandwich between the heated layer 15 and cooled layer 41 to perform the thermal/vacuum drying previously set forth.

Accordingly, it can be seen that it is believed that the various embodiments of the wet web making apparatus of this invention could be converted or modified in the above manner to provide a thermal/vacuum drying thereof with the electrostatic field means of such apparatus believed to augment the thermal/vacuum drying effect thereof.

While the forms and methods of this invention now preferred have been illustrated and described as required by the Patent Statute, it is to be understood that other forms and method steps can be utilized and still fall within the scope of the appended claims.

What is claimed is:

1. In a method for thermal/vacuum drying a wet web of material, said method comprising the steps of sandwiching a part of said wet web with a porous web between a pair of moving heat conductive layers, heating the layer adjacent said wet web, and cooling the layer adjacent said porous web to thereby cause the particles of liquid of said wet web to be vaporized by said heated layer and be condensed back to particles of liquid by said cooled layer while said layers and said webs are moving together in a sandwiched relation, the improvement comprising the step of imposing an electrostatic field means at least through part of said moving sandwich of said webs by charging at least one of said layers to augment said thermal/vacuum drying of said wet web while said part is disposed between said layers.

2. A method as set forth in claim 1 and including the step of forming at least said one of said layers to have at least a portion thereof defining an electrode means that comprises the part thereof that is being charged for imposing said electrostatic field means.

3. A method as set forth in claim 2 and including the step of forming the other of said layers to have at least a portion thereof defining an electrode means that cooperates with said electrode means of said one layer to form said electrostatic field means therebetween.

4. A method as set forth in claim 3 wherein said step of imposing comprises the step of charging said electrode means of said other layer with a different potential than the potential on said electrode means of said one layer.

5. A method as set forth in claim 4 wherein said steps of forming comprise the step of forming said electrostatic field means to comprise a plurality of non-uniform electrostatic fields extending between said electrode means.

* * * * *